United States Patent
Amend et al.

(10) Patent No.: US 11,159,442 B2
(45) Date of Patent: Oct. 26, 2021

(54) TECHNIQUES FOR EFFICIENT REORDERING OF DATA PACKETS IN MULTIPATH SCENARIOS

(71) Applicant: Deutsche Telekom AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/971,000

(22) PCT Filed: Feb. 20, 2019

(86) PCT No.: PCT/EP2019/054205
§ 371 (c)(1),
(2) Date: Aug. 19, 2020

(87) PCT Pub. No.: WO2019/162321
PCT Pub. Date: Aug. 29, 2019

(65) Prior Publication Data
US 2020/0403928 A1    Dec. 24, 2020

(30) Foreign Application Priority Data

Feb. 21, 2018 (EP) .................. 18157861

(51) Int. Cl.
*H04L 12/863* (2013.01)
*H04L 12/707* (2013.01)
*H04L 12/801* (2013.01)
(52) U.S. Cl.
CPC ............ *H04L 47/624* (2013.01); *H04L 45/24* (2013.01); *H04L 47/34* (2013.01)

(58) Field of Classification Search
CPC ......... H04L 47/10; H04L 47/30; H04L 45/00; H04L 47/34; H04L 47/32; H04L 47/50;
(Continued)

(56) References Cited

U.S. PATENT DOCUMENTS 5,914,950 A    6/1999   Tiedemann, Jr. et al.
6,246,684 B1   6/2001   Chapman et al.
(Continued)

FOREIGN PATENT DOCUMENTS

CN    1263675 A    8/2000
CN    1422502 A    6/2003
(Continued)

*Primary Examiner* — Kevin C. Harper
*Assistant Examiner* — Mon Cheri S Davenport
(74) *Attorney, Agent, or Firm* — Leydig, Voit & Mayer, Ltd.

(57) ABSTRACT

A reorder queue device for a multipath receiver includes a reorder queue and a reorder queue controller. The reorder queue is configured to queue data packets numbered in sequence which are received over multiple paths of a multipath channel. The reorder queue controller is configured to reorder the data packets in the reorder queue according to a reorder criterion, wherein the reorder criterion is based on at least one of the following: path-specific sequence numbering of the data packets, overall sequence number comparison across the multiple paths, or path-specific characteristics of the multiple paths. The data packets are numbered in a path-specific sequence and in an overall specific sequence. The reorder queue controller is configured to detect a packet loss on a specific path based on determining the overall sequence numbers and/or the path-specific sequence numbers of at least two packets of the specific path.

9 Claims, 8 Drawing Sheets (58) Field of Classification Search
CPC ..... H04L 47/2441; H04L 49/90; H04L 69/14; H04L 45/24; H04L 2012/5681; H04L 47/283; H04L 2012/6489; H04L 47/522; H04L 47/625; H04L 47/6295; H04L 1/1841; H04L 1/1874; H04L 49/3018; H04L 49/9021

See application file for complete search history.

(56) References Cited

U.S. PATENT DOCUMENTS

| | | | |
|---|---|---|---|
| 6,765,893 | B1 | 7/2004 | Bayley |
| 6,876,657 | B1* | 4/2005 | Brewer ............... H04L 49/103 370/394 |
| 7,802,002 | B2* | 9/2010 | Wee .................. H04L 47/127 709/231 |
| 10,292,069 | B2 | 5/2019 | Pasotti et al. |
| 2003/0210669 | A1 | 11/2003 | Vayanos et al. |
| 2004/0039836 | A1* | 2/2004 | Wee .................. H04L 47/283 709/231 |
| 2007/0036065 | A1 | 2/2007 | Wang |
| 2009/0116489 | A1* | 5/2009 | Hanks ............... H04L 47/34 370/394 |
| 2010/0027419 | A1 | 2/2010 | Agarwal et al. |
| 2013/0114606 | A1* | 5/2013 | Schrum, Jr. ......... H04L 47/125 370/395.53 |
| 2014/0044038 | A1 | 2/2014 | Zhang et al. |
| 2014/0201587 | A1* | 7/2014 | Luby ................... H04L 1/22 714/751 |
| 2014/0254351 | A1* | 9/2014 | Newman ............. H04L 1/1809 370/228 |
| 2015/0282005 | A1 | 10/2015 | Cho et al. |
| 2017/0134123 | A1 | 5/2017 | Damnjanovic et al. |

FOREIGN PATENT DOCUMENTS

| | | |
|---|---|---|
| CN | 1663164 A | 8/2005 |
| CN | 101548515 A | 9/2009 |
| CN | 101636976 A | 1/2010 |
| CN | 103348728 A | 10/2013 |
| CN | 105009498 A | 10/2015 |

\* cited by examiner

Fig. 8 ically figures.
TECHNIQUES FOR EFFICIENT REORDERING OF DATA PACKETS IN MULTIPATH SCENARIOS

CROSS-REFERENCE TO PRIOR APPLICATIONS

This application is a U.S. National Phase Application under 35 U.S.C. § 371 of International Application No. PCT/EP2019/054205, filed on Feb. 20, 2019, and claims benefit to European Patent Application No. EP18157861.8, filed on Feb. 21, 2018. The International Application was published in English on Aug. 29, 2019 as WO 2019/162321 A1 under PCT Article 21(2).

TECHNICAL FIELD

The invention relates to techniques for efficient reordering of data packets in multipath scenarios such as hybrid access. The invention further relates to a reorder queue device for a multipath receiver, a multipath receiver and a method for reordering data packets. In particular, the invention relates to efficient reordering mechanisms for non-reliable packet transmission in multipath scenarios.

BACKGROUND

Figure 1:
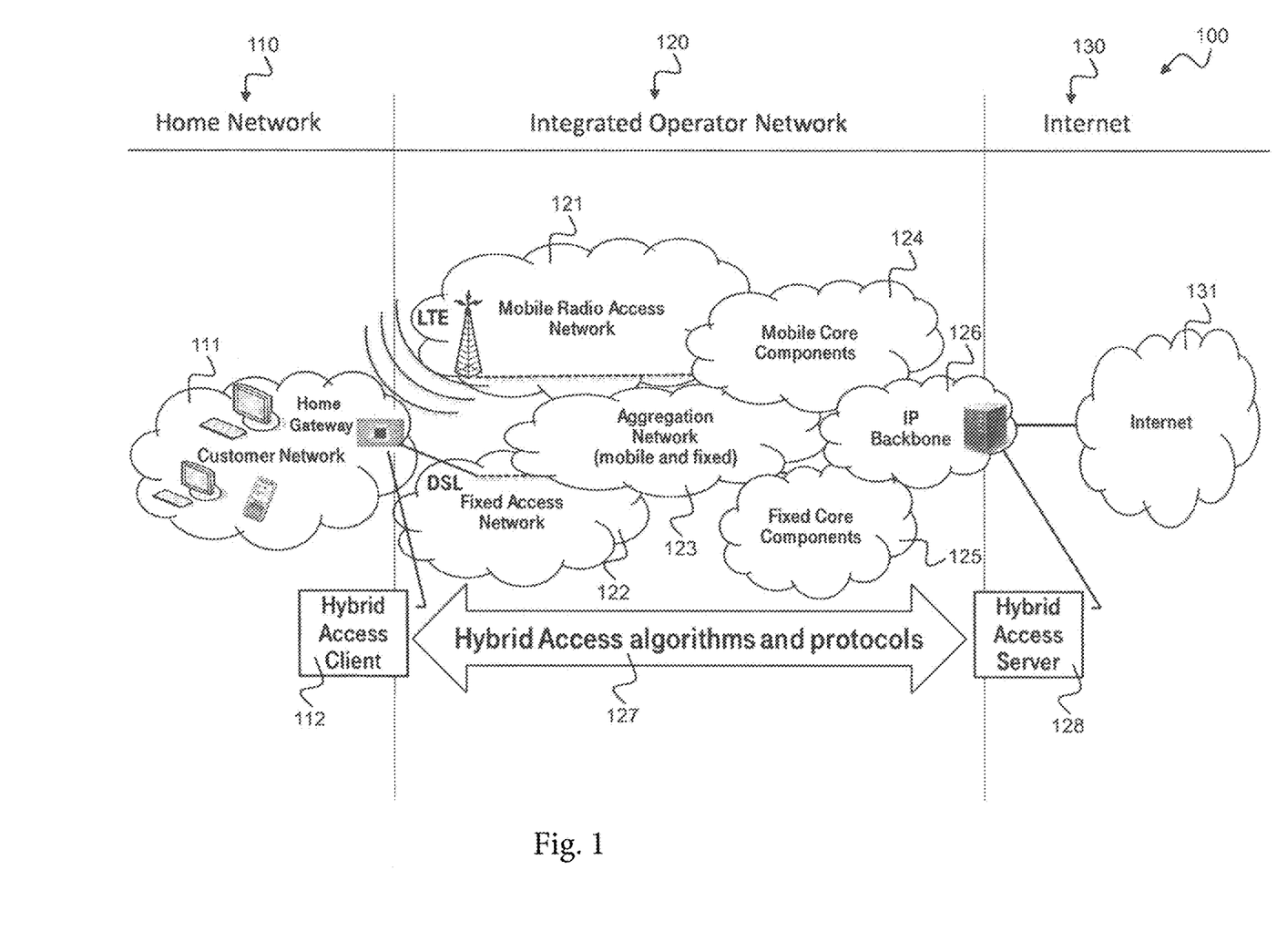
FIG. 1 shows a reference topology 100 for Hybrid Access (HA)

Hybrid Access (HA) combines at least two different network links with the same or different network technology. For example, it combines access over a fixed network with access over a cellular network, e.g., as shown in FIG. 1. One possible solution for HA is the Generic Routing Encapsulation (GRE) Tunnel Bonding Protocol according to "N. Leymann and C. Heidemann and M. Zhang and B. Sarikaya and M. Cullen, "Huawei's GRE Tunnel Bonding Protocol", RFC no. 8157, May 2017" which schedules on Open System Interconnection (OSI) Layer 3 (IP), i.e., it handles packets which are stateless and non-reliable. On the sender side, sequencing is applied before scheduling. On the receiver side, a reordering buffer is required to make sure that the IP stream is brought in the correct order as it was originally sent. Missing packets are assumed lost if the reordering queue runs out of space or a timer expires. Whenever a gap (missing packet) in the reordering queue arises, the output stream is interrupted by a static time interval that corresponds to the timer expiration time, e.g., configured by hardware to about 100 ms. This behavior regularly leads to latency spikes if in-order packet sequences alternate with missing packets. Especially higher OSI layers or the end-to-end application, which rely on constant or slow changing latencies, react negatively and may reduce speed or assume a broken link.

In principle, each solution for Hybrid Access, respectively more generic for multipath usage, which works with non-reliable protocols is affected by out-of-order delivery and potentially make use of a reordering mechanism to mitigate the issue. The aforementioned latency spikes, introduced by a reordering mechanism as described above, may significantly reduce the performance of an end-to-end transmission.

SUMMARY

In an exemplary embodiment, the present invention provides a reorder queue device for a multipath receiver, the reorder queue device including a reorder queue and a reorder queue controller. The reorder queue is configured to queue data packets numbered in sequence which are received over multiple paths of a multipath channel. The reorder queue controller is configured to reorder the data packets in the reorder queue according to a reorder criterion, wherein the reorder criterion is based on at least one of the following: path-specific sequence numbering of the data packets, overall sequence number comparison across the multiple paths, or path-specific characteristics of the multiple paths. The data packets are numbered in a path-specific sequence and in an overall specific sequence. The reorder queue controller is configured to detect a packet loss on a specific path based on determining the overall sequence numbers and/or the path-specific sequence numbers of at least two packets of the specific path.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Exemplary embodiments of the present invention provide for efficiently transmitting data packets over a multipath channel.

Exemplary embodiments of the present invention further provide efficient and reliable reordering for non-reliable packet transmission in multipath scenarios.

To overcome the concept of detecting lost packets by a static time expiration or queue overflow, which leads to arbitrary latency spikes in the scenario of reordering, exemplary embodiments of this disclosure provide for faster packet loss detection and thereby reduce latency spikes.

The methods and systems presented below may be of various types. The individual elements described may be realized by hardware or software components, for example, electronic components that can be manufactured by various technologies and include, for example, semiconductor chips, application-specific integrated circuits (ASICs), microprocessors, digital signal processors, integrated electrical circuits, electro-optical circuits and/or passive components.

The devices, systems and methods presented below are capable of transmitting information over a communication network. The term communication network refers to the technical infrastructure on which the transmission of signals takes place. The communication network comprises a switching network in which the transmission and switching of the signals takes place between stationary devices and platforms of the mobile radio network or fixed network, and an access network in which the transmission of the signals takes place between a network access device and a communication terminal. The communication network can comprise both components of a mobile radio network as well as components of a fixed network. In the mobile network, the access network is also referred to as an air interface and includes, for example, a base station (NodeB, eNodeB, radio cell) with mobile antenna to establish the communication to a communication terminal as described above, for example, a mobile phone or a mobile device with mobile adapter or a machine terminal. In the fixed network, the access network includes, for example, a DSLAM (digital subscriber line access multiplexer) to connect the communication terminals of multiple participants based on wires. Via the switching network the communication can be transferred to other networks, for example other network operators, e.g., foreign networks.

In communications and computing systems, the Open Systems Interconnection model (OSI model) defines a conceptual model that characterizes and standardizes the communication functions without regard to its underlying internal structure and technology. Its goal is the interoperability of diverse communication systems with standard protocols. The model partitions a communication system into abstraction layers. The original version of the model defined seven layers: Physical layer (Layer 1), Data Link layer (Layer 2), Network layer (Layer 3), Transport layer (Layer 4), Session layer (Layer 5), Presentation layer (Layer 6) and Application layer (Layer 7).

According to a first aspect, the invention relates to a reorder queue device for a multipath receiver, the reorder queue device comprising: a reorder queue, configured to queue data packets numbered in sequence which are received over multiple paths of a multipath channel; and a reorder queue controller, configured to reorder the data packets in the reorder queue according to a reorder criterion, wherein the reorder criterion is based on at least one of the following: path-specific sequence numbering of the data packets, overall sequence number comparison across the multiple paths, path-specific characteristics, in particular latency, of the multiple paths.

Such a reorder queue device can be applied for enabling efficient transmission of data packets over a multipath channel due to the above-mentioned reorder criterion which provides an efficient and reliable reordering for non-reliable packet transmission in multipath scenarios. The reorder criterion provides dynamic detection of lost packets and thus avoids using a static time expiration or queue overflow as described above. By using such a reorder queue device, arbitrary latency spikes in the scenario of reordering can be avoided or at least reduced in order to faster detect packet loss.

In an exemplary implementation form of the reorder queue device, the reorder queue controller is configured to detect a packet loss on a specific path of the multiple paths based on detecting at least two packets with non-sequenced path-specific sequence numbers in the reorder queue.

This provides the advantage that a packet loss can faster be detected since no waiting for any static time expiration or queue overflow is necessary. As far as two (or more) packets are in the reorder queue which path-specific (i.e. per-path) sequence numbers are not in sequence, the packet loss can be detected. Hence packet reordering can be accelerated and reception latency is decreased.

In an exemplary implementation form of the reorder queue device, the data packets are numbered in path-specific sequence and in overall specific sequence, and the reorder queue controller is configured to detect a packet loss on a specific path based on determining the overall sequence numbers and/or the path-specific sequence numbers of at least two packets of the specific path.

This provides the advantage that a packet loss on a specific path can be immediately detected with reception two (or more) packets with path sequence numbers that are not in sequence. Checking the overall sequence numbers improves the packet loss detection procedure. This results in faster detection of lost packets and avoids the effects of gaps due to missing packets in the reordering queue and interruption of the output stream with latency spikes as described above.

In an exemplary implementation form of the reorder queue device, the data packets of a specific path include an overall sequence number of a previous data packet of the specific path, and the reorder queue controller is configured to detect a packet loss on the specific path based on determining the overall sequence numbers of at least two packets of the specific path.

This provides the advantage that each path-specific packet indicates the overall sequence number of a previous path-specific packet; the controller can use this information to detect a packet loss on the specific path by checking two (or more) path-specific packets. This results in faster detection of lost packets and avoids the negative effects of gaps due to missing packets in the reordering queue and interruption of the output stream with latency spikes as described above.

In an exemplary implementation form of the reorder queue device, the data packets are numbered in an overall sequence; and the reorder queue controller is configured to detect a packet loss based on determining the overall sequence numbers of data packets received on all paths of the multipath channel.

This provides the advantage that no special path-specific sequencing on sender side is necessary, i.e. the sender can be unchanged. By evaluating the overall sequence number of packets across the paths, early detection of a packet loss can be performed, thereby avoiding the negative effects of gaps due to missing packets in the reordering queue and interruption of the output stream with latency spikes as described above.

In an exemplary implementation form of the reorder queue device, the reorder queue controller is configured to detect a packet loss when on each path of the multipath channel data packets with higher overall sequence numbers are received than a missing overall sequence number.

This provides the advantage that no special path-specific sequencing on sender side is necessary as described above, i.e. the sender can stay as it is. By evaluating the overall sequence number of packets across all paths, immediate detection of a lost data packet is possible. Hence packet reordering can be accelerated and reception latency is decreased.

In an exemplary implementation form of the reorder queue device, the reorder queue controller is configured to equalize the path-specific characteristics, in particular the latency, of the multiple paths.

This provides the advantage that by equalizing the path-specific characteristics, the reorder queue device can adapt to changing network conditions and provide low latency reordering independently of the network conditions, i.e., path latencies, qualities, round-trip time, bandwidth, etc.

In an exemplary implementation form of the reorder queue device, the reorder queue controller is configured to determine, based on the path-specific characteristics of the multiple paths, for each data packet queued in the reorder queue a lifetime after which it has to leave the reorder queue.

This provides the advantage that each path can be weighted by the lifetime. Hence different network conditions can be compensated. For example, packets arriving at high quality paths can have a higher lifetime than packets arriving at low quality paths in order to prioritize high quality network paths (or vice versa).

In an exemplary implementation form of the reorder queue device, the reorder queue controller is configured to determine the lifetime based on latency differences between paths of the multipath channel.

This provides the advantage that the lifetime can be adjusted over time, e.g., using transmitter/receiver signaling to determine the latencies of the paths, to match the multipath conditions best. Hence packet reordering can be accelerated and reception latency is decreased.

In an exemplary implementation form of the reorder queue device, the reorder queue controller is configured to determine a latency difference for a path bundle based on a latency determined for a specific path of the path bundle and a maximum latency determined over the other paths of the path bundle, in particular by a subtraction of the latency of the specific path from the maximum latency.

A path bundle is an aggregation of paths of the multiple paths received via the multipath channel. The path bundle may include all paths or only a subset of paths from the received multiple paths.

This provides the advantage that an individual lifetime can be calculated for each packet after which it has to be sent out of the reorder queue. Hence the reorder can be efficiently adapted to changing network conditions.

In an exemplary implementation form of the reorder queue device, the reorder queue controller is configured to determine the path-specific characteristics based on round-trip time measurements, bandwidth measurements, estimations, external input and/or knowledge.

This provides the advantage that the reorder queue controller can easily detect the path-specific characteristics and thus efficiently balance the reorder queue in order to guarantee for an efficient and reliable reordering at receiver side.

In an exemplary implementation form of the reorder queue device, the reorder queue controller is configured to adjust a time expiration, in particular an out-of-order timer, of the reorder queue and/or a queue size, in particular a maximum per flow buffer parameter, of the reorder queue based on the path-specific characteristics.

This provides the advantage that the (originally) static parameters of timer expiration and buffer length can be made dynamic in order to adapt to changing network conditions and hence provide low-latency and reliable reordering, particularly for unstable and unreliable network conditions.

According to a second aspect, the invention relates to a multipath receiver, comprising: a reorder queue device according to the first aspect of the invention, configured to queue and reorder data packets received over a multipath channel; and a receiver, configured to receive the reordered data packets.

Such a multipath receiver guarantees efficient transmission of data packets in multipath scenarios. The reorder criterion of the reorder queue controller provides an efficient and reliable reordering for non-reliable packet transmission. The reorder criterion provides dynamic detection of lost packets and thus avoids using a static time expiration or queue overflow. By using such a multipath receiver, arbitrary latency spikes in the reordering can be avoided or at least reduced, thereby enabling faster packet loss detection.

According to a third aspect, the invention relates to a method for reordering data packets numbered in sequence, the method comprising: receiving data packets over multiple paths of a multipath channel; queuing the data packets in a reorder queue; and reordering the data packets in the reorder queue according to a reorder criterion, wherein the reorder criterion is based on at least one of the following: path-specific sequence numbering of the data packets, overall sequence number comparison across the multiple paths, path-specific characteristics, in particular latency, of the multiple paths.

Such a method provides efficient transmission of data packets over a multipath channel due to the reorder criterion which enables efficient and reliable reordering for non-reliable packet transmission in multipath scenarios. The reorder criterion provides dynamic detection of lost packets and thus avoids using a static time expiration or queue overflow. By using such a method, arbitrary latency spikes in the scenario of reordering can be avoided or at least reduced in order to faster detect packet loss.

According to a fourth aspect, the invention relates to a computer readable non-transitory medium on which computer instructions are stored which, when executed by a computer, cause the computer to perform the method according to the third aspect of the invention.

According to a fifth aspect the invention relates to a computer program product comprising program code for performing the method according to the fourth aspect of the invention, when executed on a computer or a processor.

Embodiments of the invention can be implemented in hardware and/or software.

The following acronyms are applied in this disclosure:

| | |
|---|---|
| DSL | Digital Subscriber Line |
| GRE | Generic Routing Encapsulation |
| HA | Hybrid Access |
| IP | Internet Protocol |
| LTE | Long Term Evolution |
| OSI | Open System Interconnection |
| QoE | Quality of Experience |

In the following detailed description, reference is made to the accompanying drawings, which form part of the disclosure, and in which are shown, by way of illustration, exemplary aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIG. 1 shows a reference topology 100 for Hybrid Access (HA). The reference topology 100 illustrates the Home Network zone 110 with Customer Network 111 and Home Gateway with Hybrid Access Client 112, the Integrated Operator Network 120 with a variety of operator networks 121, 122, 123, 124, 125, 126 and the Internet zone 130 with the Internet 131. At the operator networks 121, 122, 123, 124, 125, 126 Hybrid Access algorithms and protocols 127 are implemented to connect the Hybrid Access Client 112 with the Hybrid Access Server 128 for connection with the Internet 131.

Hybrid Access (HA) combines at least two different network links with the same or different network technology; for example, it combines the access over the fixed network 122 with the access over the cellular network 121. FIG. 1 shows a typical scenario for HA but can also be implemented as an over the top (OTT) solution. The HA client 112 has at least two access interfaces, one for example for Digital Subscriber Line (DSL) access 122 and another one for example for access to the Long Term Evolution (LTE) network 121. The considerations on the HA algorithms are focused on a distributed client-server solution with client functionality in the residential gateway and server functionality (HA Server 128) in a data center at the network of the operator 126 or in the public Internet 131. However, multipath usage can be also directly applied on end devices, without having intermediate devices on behalf.

Figure 2:
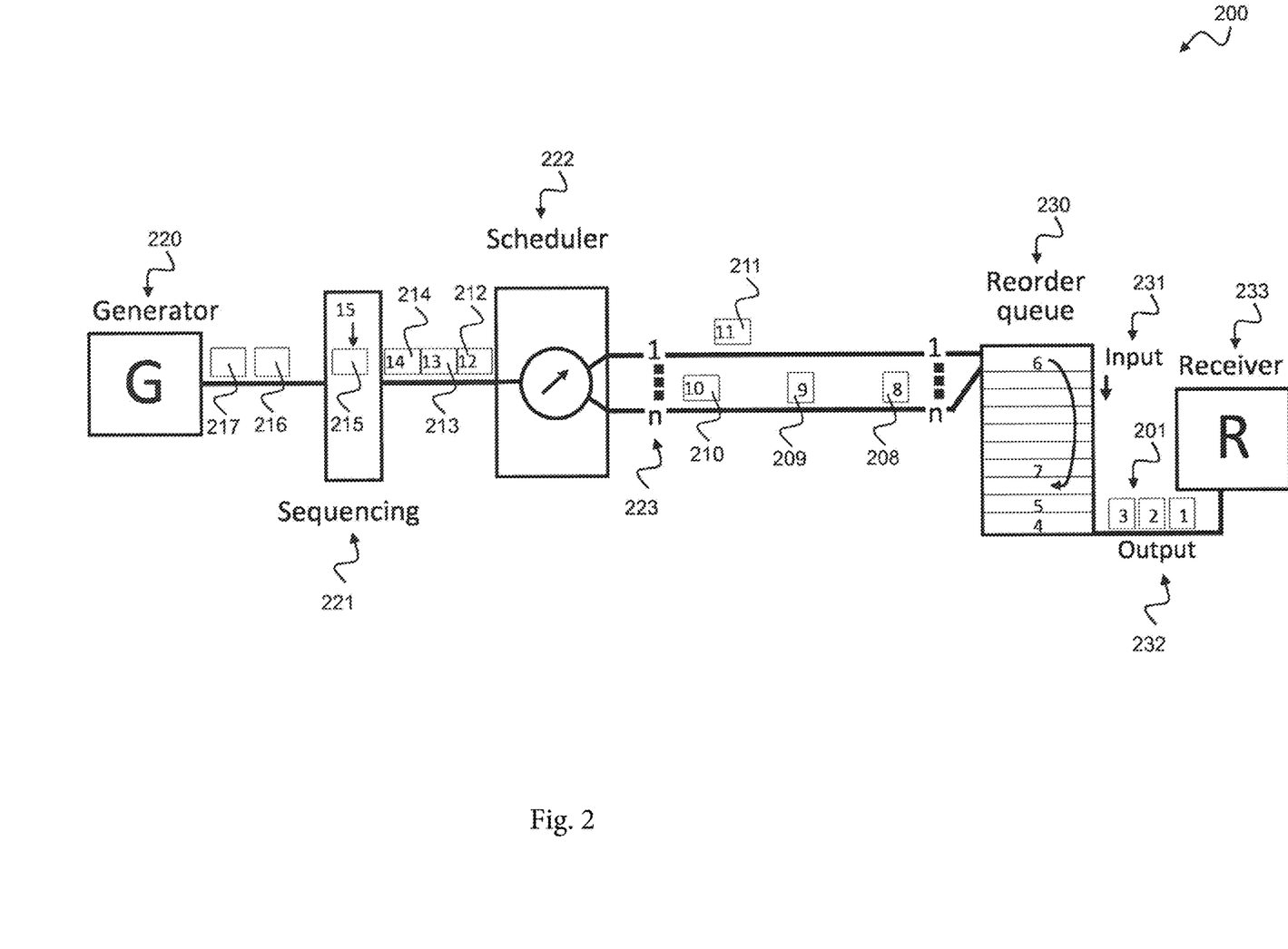
FIG. 2 shows a schematic diagram illustrating a Hybrid Access sequencing and reordering mechanism 200.

One possible solution for HA is the GRE Tunnel Bonding Protocol according to "N. Leymann and C. Heidemann and M. Zhang and B. Sarikaya and M. Cullen, "Huawei's GRE Tunnel Bonding Protocol", RFC no. 8157, May 2017" which schedules on OSI Layer 3 (IP). The GRE Tunnel Bonding Protocol handles packets which are stateless and non-reliable, but has to make sure that on receiver side the IP stream is brought in the correct order how it was originally sent, e.g., by using Hybrid Access sequencing and reordering mechanism 200 as shown in FIG. 2. Otherwise, significant QoE issues can appear if introduced scrambling by multipath scheduling happens. To solve this issue, sequencing is applied before scheduling on the sender side, which is then utilized on the receiver side in a so called reordering buffer as shown in FIG. 3.

FIG. 2 shows a schematic diagram illustrating a Hybrid Access sequencing and reordering mechanism 200.

A generator 220 generates data packets 217, 216 that pass a sequencing module 221 which assigns each packet 215 a respective sequence number. The sequenced data packets 212, 213, 214 are passed to a scheduler 222 which schedules the data packets to multiple paths 223 of a multipath channel. The data packets ordered in sequence 212, 213, 214 are transmitted over the multipath channel and are queued in a reorder queue 230 at the receiver side where they arrive at an input 231 of the reorder queue 230. In the reorder queue 230 the data packets are reordered and reordered data packets 201 are provided at an output 232 to the receiver 233.

Figure 3:
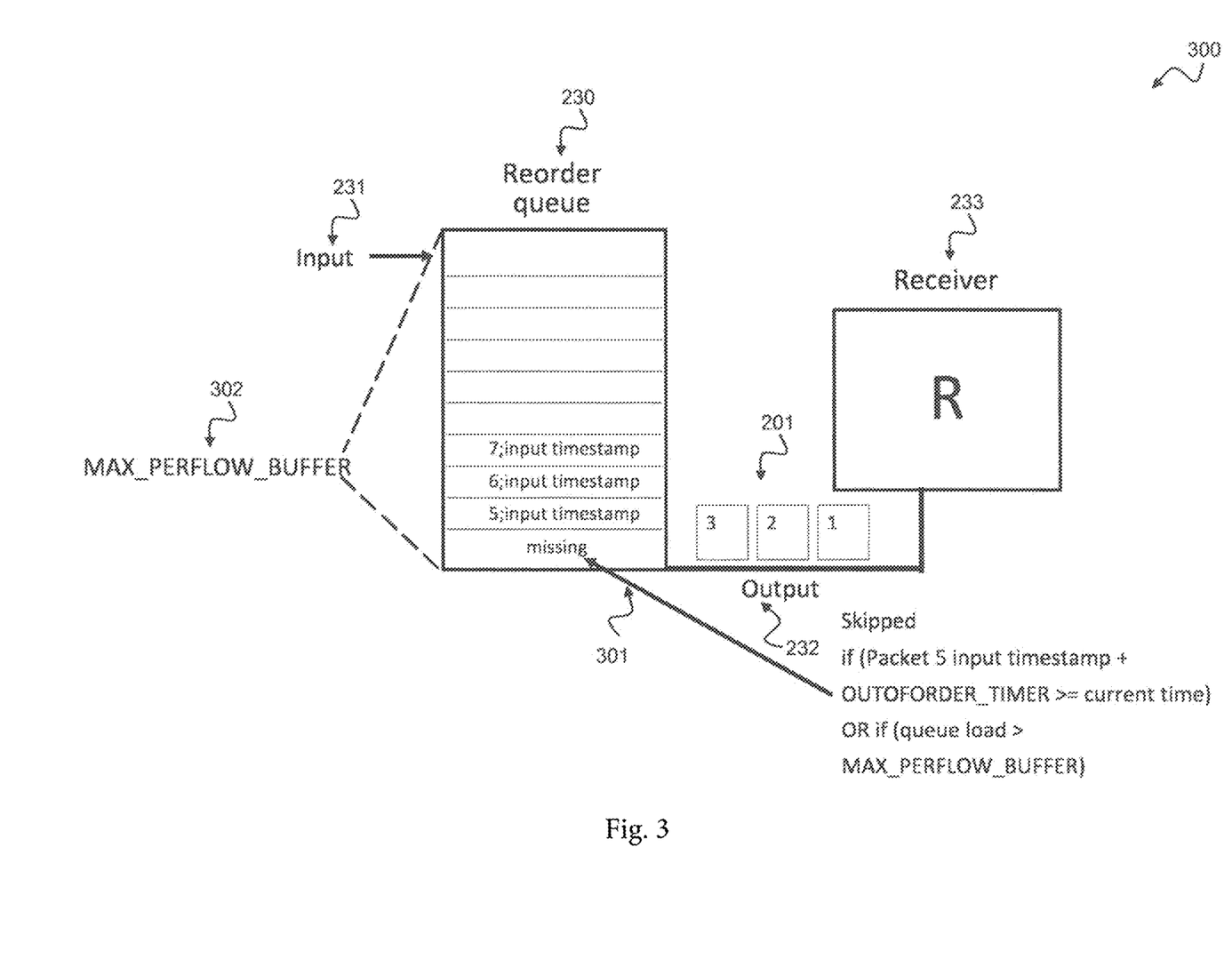
FIG. 3 shows a schematic diagram illustrating a receiver device 300 with a parameterized reordering queue according to RFC 8157.

FIG. 3 shows a schematic diagram illustrating a receiver device 300 with a parameterized reordering queue according to RFC 8157. The receiver device 300 includes a reorder queue 230 and a receiver 233. The reorder queue 230 has an input 231 receiving data packets that may be out-of-sequence. A buffer length of the reorder queue is denoted as MAX_PERFLOW_BUFFER 302. Data packets received are buffered in the reorder queue together with a timestamp. For example, missing packet 4 is skipped if not arriving from the reorder queue 230 if the following condition 301 is true: (packet 5 input timestamp+OUTOFORDER_TIMER>=current time) OR (queue load>MAX_PERFLOW_BUFFER). That means, a missing packet, e.g., packet with sequence number 4, is skipped from the reorder queue 230 if the input timestamp of packet with sequence number 5 plus value of OUTOFORDER_TIMER is greater or equal than the current time; or if a queue load of the reorder queue 230 is greater than value of MAX_PERFLOW_BUFFER. Both parameters OUTOFORDER_TIMER and MAX_PERFLOW_BUFFER may be predefined values or constants. At the output 232 of the reorder queue 230 reordered data packets 201 are provided to receiver 233.

The receiver device 300 shown in FIG. 3 orders the packets based on the sender side assigned sequence number. Missing packets are assumed lost, if the reordering queue 230 runs out of space (MAX_PERFLOW_BUFFER or a timer expires (OUTOFORDER_TIMER). Whenever a gap (missing packet) in the reordering queue 230 arises, the output stream 201 is interrupted by the time of OUTOFORDER_TIMER. FIG. 3 illustrates this behavior, which regularly leads to latency spikes, determined by the OUTOFORDER_TIMER, if in-order packet sequences alternates with missing packets. Especially higher OSI layers or the end-to-end application, which rely on constant or slow changing latencies, react negatively and may reduce speed or assume a broken link.

To overcome the concept of detecting lost packets by a static time expiration or queue overflow, which leads to arbitrary latency spikes in the scenario of reordering, exemplary embodiments are described below with respect to FIGS. 4 to 8 in order to faster detect packet loss and thereby reduce latency spikes.

For the following two presented reorder criteria 400, 500 described below with respect to FIGS. 4 and 5, it is assumed that packet scrambling on a single path cannot happen. Especially in controlled environments that can be ensured. Furthermore, sequencing is assumed to start from a low value and increase with the number of packets. This is just for illustrative reasons and can be different in practice.

Figure 4:
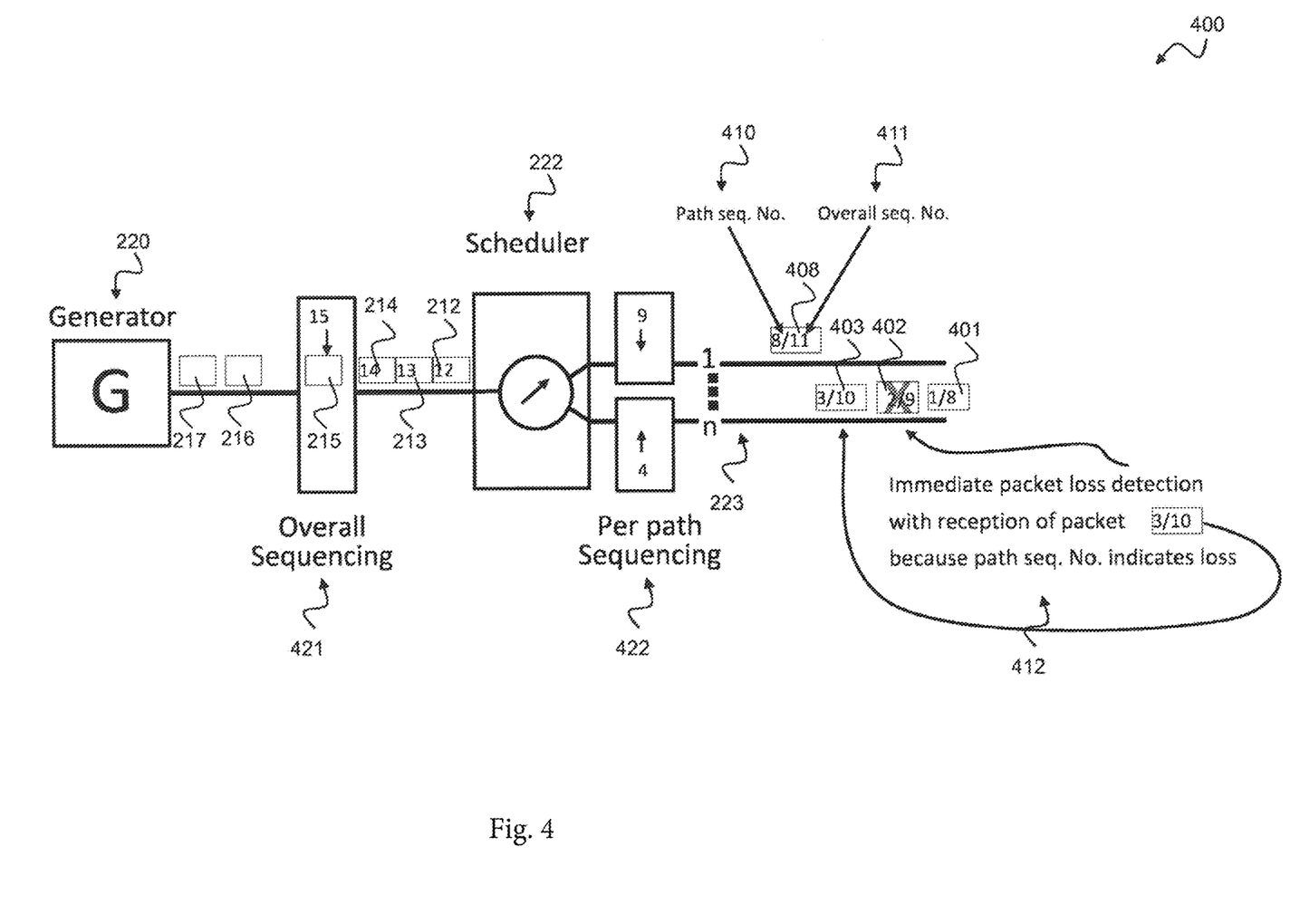
FIG. 4 shows a schematic diagram illustrating a first reorder criterion 400 according to the disclosure that is based on path packet loss detection by additional path sequencing.

FIG. 4 shows a schematic diagram illustrating a first reorder criterion 400 according to the disclosure that is based on path packet loss detection by additional path sequencing. The first reorder criterion 400 is illustrated with a multipath transmitter including a generator 220, an overall sequencing module 421, a scheduler 222 and a per path sequencing module 422.

The generator 220 generates data packets 217, 216 that pass the overall sequencing module 421 which assigns each packet 215 a respective overall sequence number. The sequenced data packets 212, 213, 214 are passed to the scheduler 222 which schedules the data packets to multiple paths 223 of a multipath channel. In each path, a per path sequencing module 422 assigns each packet a per-path sequence number. For example, data packets 401, 402, 403 on path n (e.g. n=2) are assigned with per path sequence numbers 1, 2 and 3 and with overall sequence numbers 8, 9, 10; while data packet 408 on path 1 is assigned with per path sequence number 8 and overall sequence number 11. An overall sequence number is a unique sequence number for all packets; a per-path sequence number (also referred to as path-specific sequence number) is a sequence number that is unique per path.

The data packets ordered in sequence 401, 402, 403, 408 (with path-specific sequence number 410 and overall sequence number 411) are transmitted over the multipath channel and received on receiver side where an immediate packet loss detection 412 can be performed. In this example, packet 402 (overall sequence number 9 and per-path sequence number 2) is lost. With reception of packet 403 (overall sequence number 10 and per-path sequence number 3) a packet loss can be detected because path sequence number, that is 3, indicates a packet loss due to reception of packet 401 with path sequence number 1.

The first reorder criterion 400 extends sequencing from an overall sequencing to an additional per path sequencing. With this, the packet flow on a single path can be checked for packet loss, e.g. if three packets (1,2,3) 401, 402, 403 are sent on a single path and the packet 402 with path sequence No. 2 fails, it can be easily and immediately detected when the packet 403 with path sequence No. 3 arrives, as shown in FIG. 4. An equivalent solution is to include the overall sequence number 411 of the previous packet sent on the same path.

Figure 5:
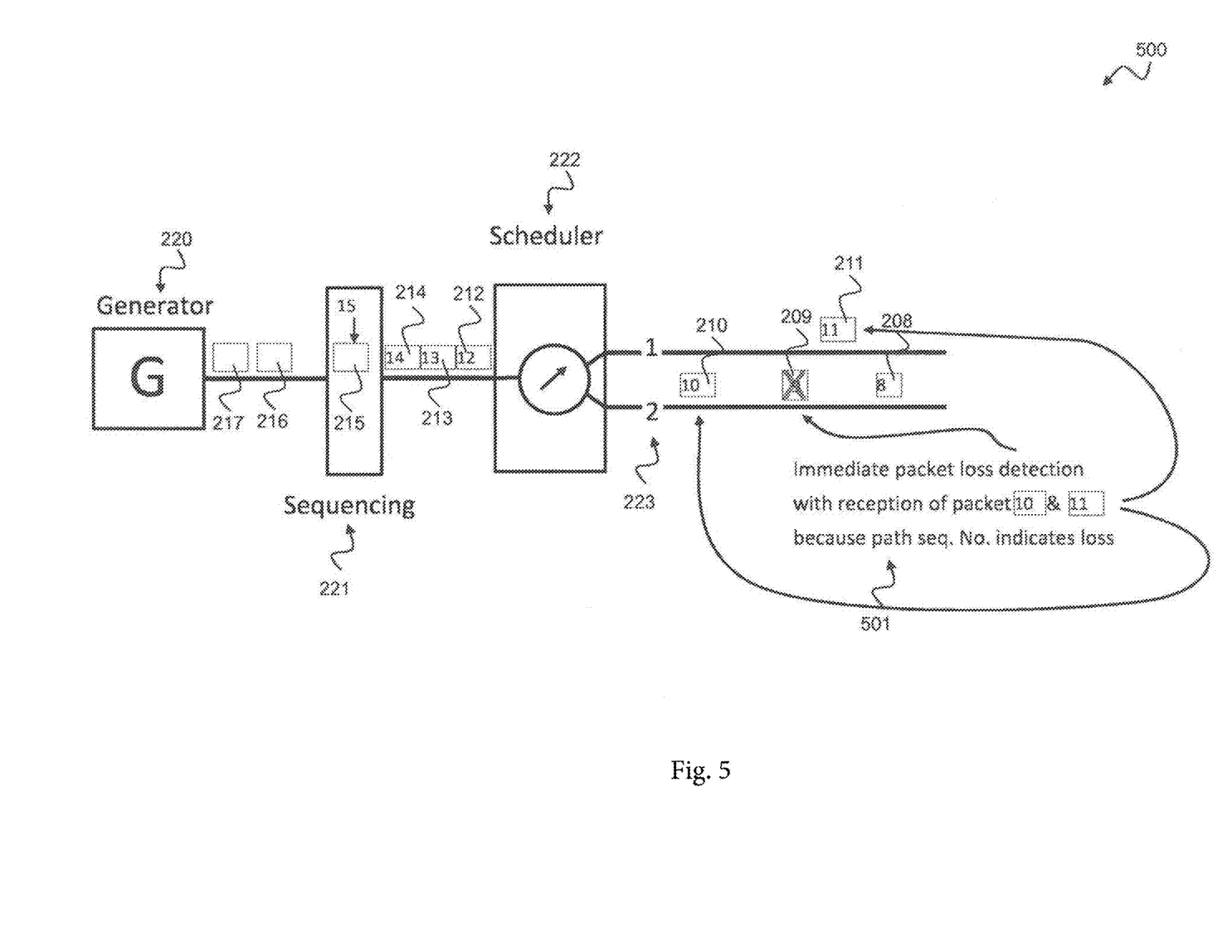
FIG. 5 shows a schematic diagram illustrating a second reorder criterion 500 according to the disclosure that is based on comparing of overall sequence number across paths to detect packet loss.

FIG. 5 shows a schematic diagram illustrating a second reorder criterion 500 according to the disclosure that is based on comparing of overall sequence number across paths to detect packet loss.

The second reorder criterion 500 is illustrated with a multipath transmitter including a generator 220, a sequencing module 221 that may correspond to an overall sequencing module 421 as described above with respect to FIG. 4, and a scheduler 222.

The generator 220 generates data packets 217, 216 that pass the sequencing module 221 which assigns each packet 215 a respective sequence number. The sequenced data packets 212, 213, 214 are passed to the scheduler 222 which schedules the data packets to multiple paths 223 of a multipath channel.

The data packets ordered in sequence 208, 209, 210, 211 (with sequence numbers 8, 9, 10, 11) are transmitted over the multipath channel and received on the receiver side where immediate packet loss detection 501 can be performed. In this example, packet 209 with (overall) sequence number 9 is lost. With reception of packets 210, 211 on path 2 and path 1 (overall sequence numbers 10 and 11) a packet loss can be detected because path sequence number 11 on path 1 and path sequence number 10 on path 2 indicates loss.

The second reorder criterion 500 can be applied to detect immediately packet loss by comparing the overall sequence numbers of the different flows as shown in FIG. 5. When on all paths higher sequence numbers occur than the potential missing one(s), the potential missing one(s) is/are lost. For illustration FIG. 5 is shown with two paths, of course further paths can be implemented as well.

Figure 6:
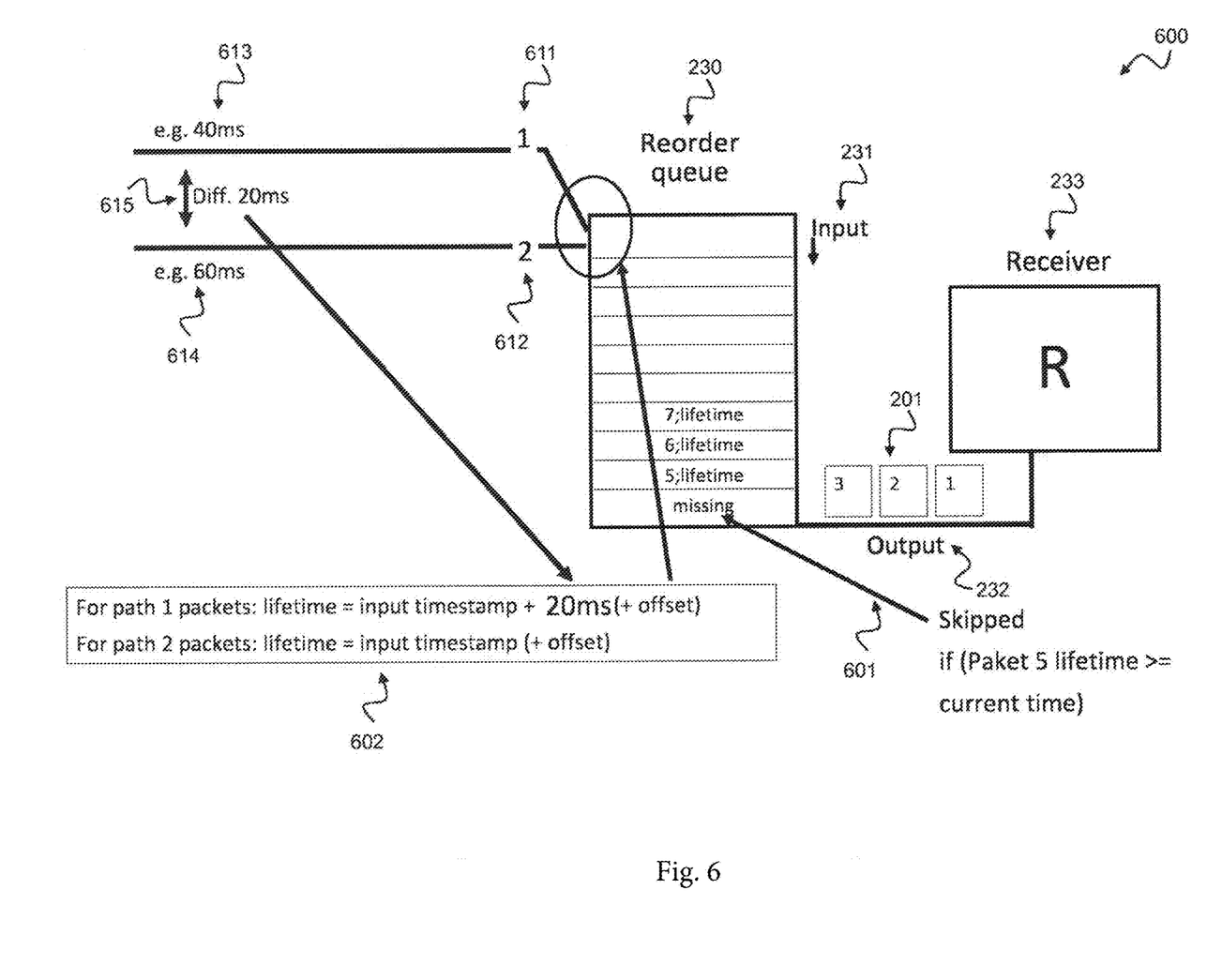
FIG. 6 shows a schematic diagram illustrating a third reorder criterion 600 according to the disclosure that is based on individual per packet calculation of reordering queue expiration.

FIG. 6 shows a schematic diagram illustrating a third reorder criterion 600 according to the disclosure that is based on individual per packet calculation of reordering queue expiration.

The third reorder criterion 600 is illustrated with a multipath receiver including a reorder queue 230 and a receiver 233, e.g., according to the description of FIG. 3.

The reorder queue 230 has an input 231 receiving data packets that may be out-of-sequence. A buffer length of the reorder queue 230 can be denoted as MAX_PERFLOW_BUFFER. Data packets received are buffered in the reorder queue together with a lifetime. For example packet 4 is skipped from the reorder queue 230 if the following condition 601 is true: (lifetime of packet 5>=current time). That means, a missing packet, e.g., packet with sequence number 4, is skipped from the reorder queue 230 if its lifetime is greater or equal than the current time. The lifetime can be determined based on a latency difference 615 between two paths 611, 612. In this example, only two paths 611, 612 of a multipath channel are illustrated. However, the multipath channel may have more than two paths. In this example on first path a latency 613 of 40 ms is determined while on second path 612 a latency of 60 ms is determined. Hence the latency difference 615 is 20 ms. For path 1, the lifetime can be determined according to the following relation: lifetime=input timestamp+20 ms (+ offset). For path 2, the lifetime can be determined according to the following relation: lifetime=input timestamp (+ offset). At the output 232 of the reorder queue 230 reordered data packets 201 are provided to receiver 233.

In the third reorder criterion 600, the time expiration, e.g., the HA OUTOFORDER_TIMER and/or the queue size with MAX_PERFLOW_BUFFER (as described above with respect to FIG. 3), can be configured dynamically. For example, based on round-trip time measurements, bandwidth measurements, estimations, external input or knowledge, this parameter can be adjusted over time using transmitter/receiver signaling to match multipath conditions best. Especially the latency difference 615 between the paths 611, 612, which has to be equalized by the reordering mechanism, is a key parameter and varies with changing network conditions. The latency difference 615 can be built by taking the current path latency (e.g. 613) and the highest path latency (e.g. 614) out of the active path bundle 611, 612 and subtract the current 613 from the highest 614. With that, an individual lifetime can be calculated for each packet after which it has to be sent out of the reordering queue 230, as shown in FIG. 6.

All reorder criteria 400, 500, 600 as described in FIGS. 4, 5 and 6 can be combined arbitrarily. The highest benefit can be gained by combining all together.

Figure 7:
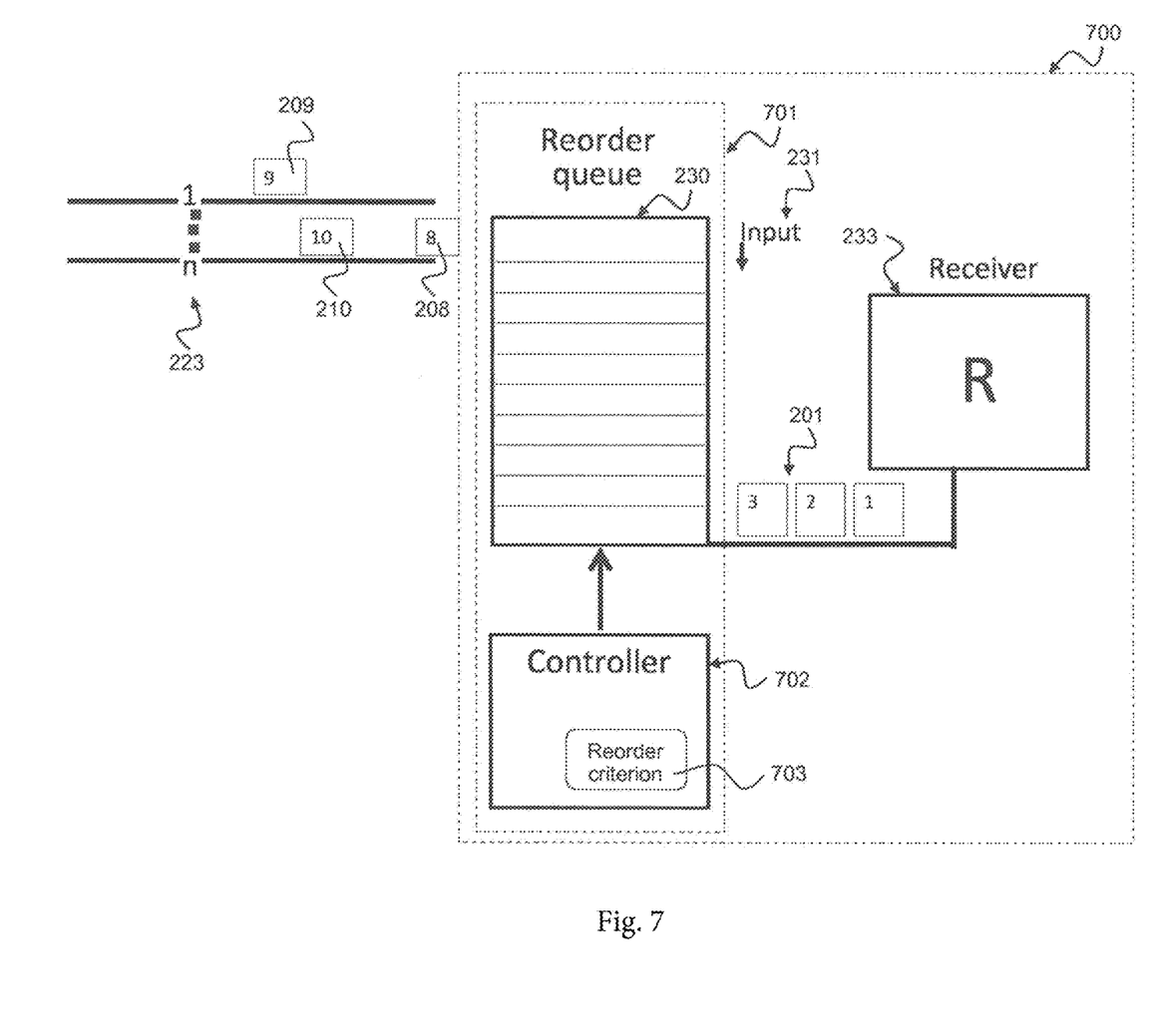
FIG. 7 shows a schematic diagram illustrating a multipath receiver 700 according to the disclosure.

FIG. 7 shows a schematic diagram illustrating a multipath receiver 700 according to the disclosure. The multipath receiver 700 includes a reorder queue device 701 that is configured to queue and reorder data packets 208, 209, 210 received over a multipath channel; and a receiver 233 that is configured to receive the reordered data packets 201.

The reorder queue device 701 used with the multipath receiver 700 comprises a reorder queue 230, e.g. as described above with respect to FIGS. 2 to 6 and a reorder queue controller 702. The reorder queue 230 is configured to queue the data packets 208, 209, 210 which are numbered in sequence and which are received over multiple paths 223 of the multipath channel. The reorder queue controller 702 is configured to reorder the data packets 208, 209, 210 in the reorder queue 230 according to a reorder criterion 703, e.g., a reorder criterion 400, 500, 600 as described above with respect to FIGS. 4 to 6. The reorder criterion 703 is based on one or a combination of the following criteria: path-specific sequence numbering 400 of the data packets 208, 209, 210, overall sequence number comparison 500 across the multiple paths 223, path-specific characteristics 600, in particular latency, of the multiple paths 223.

The reorder queue controller 702 may be configured to detect a packet loss 402 on a specific path of the multiple paths 223 based on detecting at least two packets 401, 403 with non-sequenced path-specific sequence numbers 410 in the reorder queue 230, e.g., as described above with respect to FIG. 4.

In an exemplary implementation, the data packets 208, 209, 210 are numbered in path-specific sequence 422 and in overall specific sequence 421, and the reorder queue controller 702 is configured to detect a packet loss 402 on a specific path based on determining the overall sequence numbers 411 and/or the path-specific sequence numbers 410 of at least two packets 401, 403 of the specific path, e.g., as described above with respect to FIG. 4.

In an exemplary implementation, the data packets 208, 209, 210 of a specific path may include an overall sequence number 411 of a previous data packet of the specific path, and the reorder queue controller 702 may be configured to detect a packet loss 402 on the specific path based on determining the overall sequence numbers 411 of at least two packets of the specific path, e.g., as described above with respect to FIG. 4.

In an exemplary implementation form, the data packets 401, 402, 403 may be numbered in an overall sequence 221; and the reorder queue controller 702 may be configured to detect a packet loss 209 based on determining the overall sequence numbers 210, 211 of data packets received on all paths of the multipath channel, e.g., as described above with respect to FIG. 5. The reorder queue controller 702 may detect a packet loss 209 when on each path of the multipath channel data packets 210, 211 with higher overall sequence numbers are received than a missing overall sequence number, e.g., as described above with respect to FIG. 5.

The reorder queue controller 702 may be configured to equalize the path-specific characteristics, in particular the latency 613, 614, of the multiple paths, e.g., as described above with respect to FIG. 6.

The reorder queue controller 702 may be configured to determine, based on the path-specific characteristics 613, 614 of the multiple paths 223, for each data packet queued in the reorder queue 230, a lifetime after which it has to leave 601, i.e., is skipped from the reorder queue 230, e.g., as described above with respect to FIG. 6. The reorder queue controller 702 may determine the lifetime based on latency differences 615 between paths 223 of the multipath channel, e.g., as described above with respect to FIG. 6. The reorder queue controller 702 may determine a latency difference 615 for a path bundle based on a latency 613 determined for a specific path of the path bundle and a maximum latency 614 determined over the other paths of the path bundle, in particular by a subtraction of the latency 613 of the specific path from the maximum latency 614, e.g., as described above with respect to FIG. 6.

The reorder queue controller 702 may determine the path-specific characteristics 613, 614 based on round-trip time measurements, bandwidth measurements, estimations, external input and/or knowledge.

The reorder queue controller 702 may be configured to adjust a time expiration, in particular an out-of-order timer 301 of the reorder queue 230, e.g., as described above with respect to FIG. 3, and/or a queue size, in particular a maximum per flow buffer parameter 302, e.g., as described above with respect to FIG. 3, of the reorder queue 230 based on the path-specific characteristics 613, 614, e.g., as described above with respect to FIG. 6.

Figure 8:
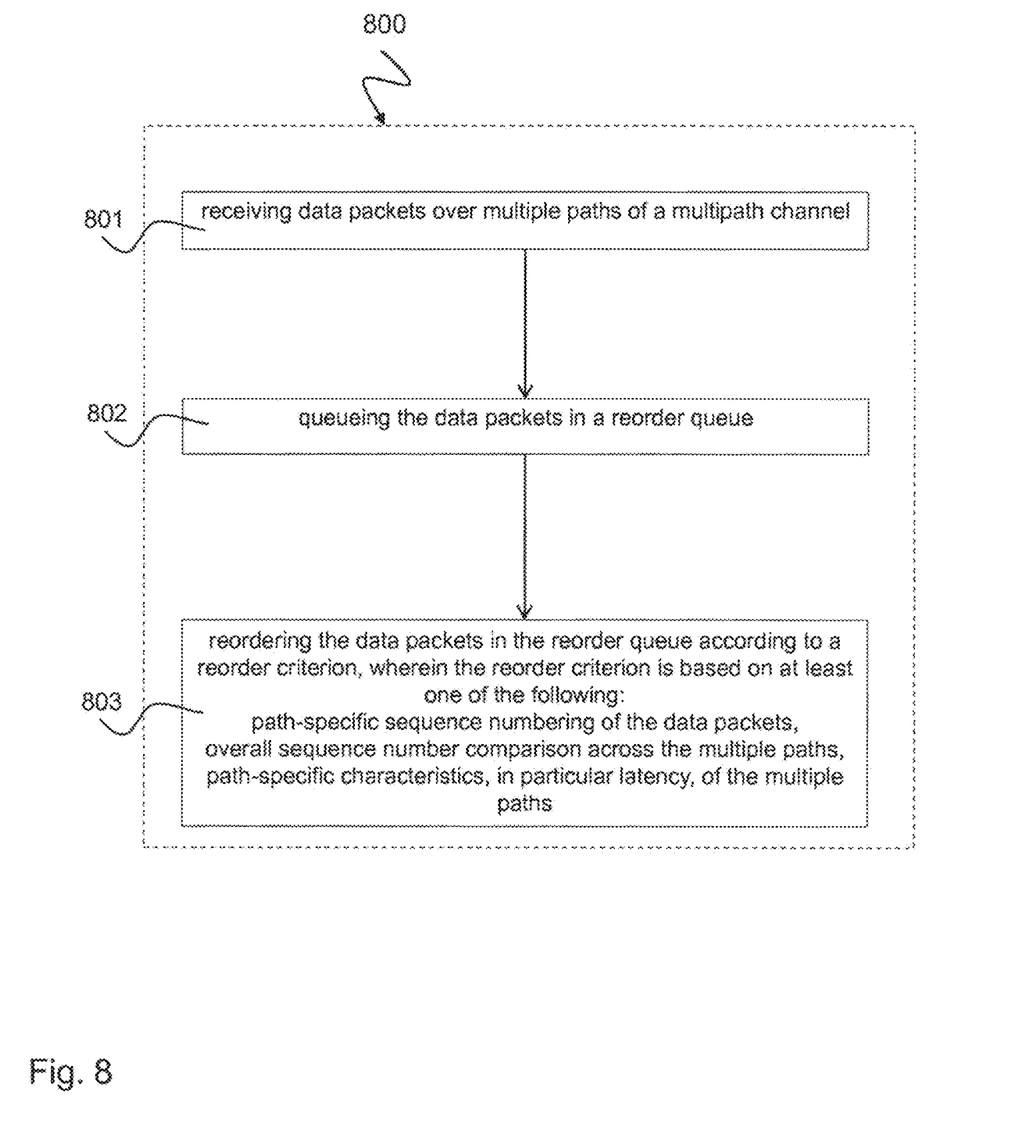
FIG. 8 shows a schematic diagram illustrating a method 800 for reordering data packets numbered in sequence according to the disclosure.

FIG. 8 shows a schematic diagram illustrating a method 800 for reordering data packets numbered in sequence according to the disclosure.

The method 800 includes receiving 801 data packets 208, 209, 210 over multiple paths 223 of a multipath channel, e.g., as described above with respect to FIGS. 2 to 7.

The method 800 includes queuing 802 the data packets 208, 209, 210 in a reorder queue 230, e.g., as described above with respect to FIGS. 2 to 7.

The method 800 further includes reordering 803 the data packets 208, 209, 210 in the reorder queue 230 according to a reorder criterion 703, wherein the reorder criterion 703 is based on at least one of the following: path-specific sequence numbering 400 of the data packets (208, 209, 210), overall sequence number comparison 500 across the multiple paths 223, path-specific characteristics 600, in particular latency, of the multiple paths 223, e.g. as described above with respect to FIGS. 2 to 7.

The method 800 may be implemented in a receiver device 700 as described above with respect to FIG. 7, in particular in a reorder queue controller 702, e.g., as described above with respect to FIG. 7.

The method 800 may include further steps, such as, for example, according to the computing blocks described above with reference to FIGS. 4 to 7, in particular as described above with respect to the multipath receiver 700 of FIG. 7.

The method 800 may be implemented on a computer. Another aspect of the invention relates to a computer readable non-transitory medium on which computer instructions are stored which, when executed by a computer, cause the computer to perform the method 800.

Another aspect of the invention is related to a computer program product comprising program code for performing the method 800 or the functionalities described above, when executed on a computer or a processor. The method 800 may be implemented as program code that may be stored on a non-transitory computer medium. The computer program product may implement the techniques described above with respect to FIGS. 4 to 8.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A reorder queue device for a multipath receiver, the reorder queue device comprising:
    a reorder queue, configured to queue a plurality of data packets which are received over multiple paths of a multipath channel, wherein the plurality of data packets includes a first plurality of data packets received over a first path of the multiple paths and a second plurality of data packets received over a second path of the multiple paths, wherein each of the plurality of data packets is numbered according to an overall sequence, wherein each of the first plurality of data packets is numbered according to a first path-specific sequence corresponding to the first path, and wherein each of the second plurality of data packets is numbered according to a second path-specific sequence corresponding to the second path; and
    a reorder queue controller, configured to:
        reorder the data packets in the reorder queue according to the overall sequence; and
        upon a first respective packet of the first path having a first sequence number of the first path-specific sequence being received without having received a second respective packet of the first path having a second sequence number of the first path-specific sequence, detect a packet loss on the first path based on determining that the first respective packet of the first path having the first sequence number of the first path-specific sequence was received without having received the second respective packet of the first path having the second sequence number of the first path-specific sequence, wherein the second sequence number of the first path-specific sequence precedes the first sequence number of the first path-specific sequence.

2. A reorder queue device for a multipath receiver, the reorder queue device comprising:
    a reorder queue, configured to queue a plurality of data packets which are received over multiple paths of a multipath channel, wherein the plurality of data packets includes a first plurality of data packets received over a first path of the multiple paths and a second plurality of data packets received over a second path of the multiple paths, wherein each of the plurality of data packets is numbered according to an overall sequence, wherein each of the first plurality of data packets is numbered according to a first path-specific sequence corresponding to the first path, and wherein each of the second plurality of data packets is numbered according to a second path-specific sequence corresponding to the second path; and
    a reorder queue controller, configured to:
        reorder the data packets in the reorder queue according to the overall sequence; and
        upon expiration of a packet-specific lifetime, detect a packet loss based on the expiration of the packet-specific lifetime, wherein the packet-specific lifetime is determined based on path-specific characteristics, wherein the packet-specific lifetime for a first data packet of the first plurality of data packets is different from the packet-specific lifetime for a second data packet of the second plurality of data packets.

3. The reorder queue device of claim 2, wherein the reorder queue controller is configured to equalize the path-specific characteristics of the multiple paths.

4. The reorder queue device of claim 2, wherein the reorder queue controller is configured to determine the packet-specific lifetime for a respective data packet based on latency differences between paths of the multipath channel.

5. The reorder queue device of claim 4, wherein the reorder queue controller is configured to determine a latency difference for a path bundle based on a latency determined for a specific path of the path bundle and a maximum latency determined over the other paths of the path bundle.

6. The reorder queue device of claim 2, wherein the reorder queue controller is configured to determine the path-specific characteristics based on round-trip time measurements, bandwidth measurements, estimations, external input and/or knowledge.

7. The reorder queue device of claim 2, wherein the reorder queue controller is configured to adjust a time expiration of the reorder queue and/or a queue size of the reorder queue based on the path-specific characteristics.

8. A multipath receiver, comprising:
    a reorder queue device according to claim 1, configured to queue and reorder data packets received over a multipath channel; and a receiver, configured to receive the reordered data packets.

9. A reorder queue device for a multipath receiver, the reorder queue device comprising:
   a reorder queue, configured to queue a plurality of data packets which are received over multiple paths of a multipath channel, wherein the plurality of data packets includes a first plurality of data packets received over a first path of the multiple paths and a second plurality of data packets received over a second path of the multiple paths, wherein each of the plurality of data packets is numbered according to an overall sequence, wherein each of the first plurality of data packets is numbered according to a first path-specific sequence corresponding to the first path, and wherein each of the second plurality of data packets is numbered according to a second path-specific sequence corresponding to the second path; and
   a reorder queue controller, configured to:
      reorder the data packets in the reorder queue according to the overall sequence; and
      upon receiving a first respective packet of the first path having a first overall sequence number of the overall sequence and a second respective packet of the second path having a second overall sequence number of the overall sequence without having received a third respective packet having a third overall sequence number of the overall sequence, detect a packet loss based on determining that the first respective packet of the first path having the first overall sequence number of the overall sequence and the second respective packet of the second path having the second overall sequence number of the overall sequence were received without having received the third respective packet having the third overall sequence number of the overall sequence, wherein the third overall sequence number of the overall sequence precedes the first and second overall sequence numbers of the overall sequence.

* * * * *